Feb. 6, 1934.   J. ESCHNER   1,946,066
PARACHUTE
Filed Aug. 26, 1931   2 Sheets-Sheet 1
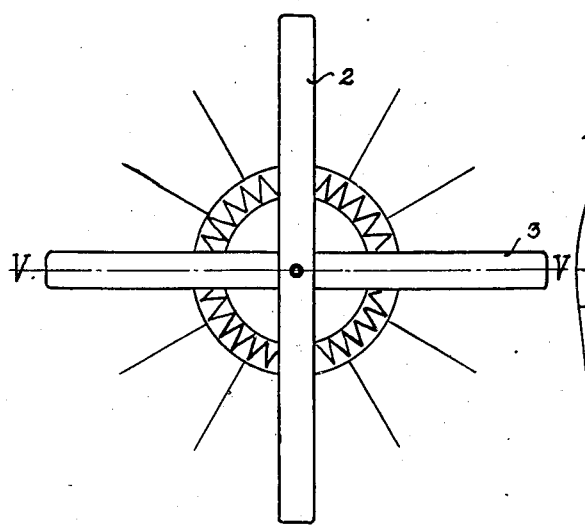
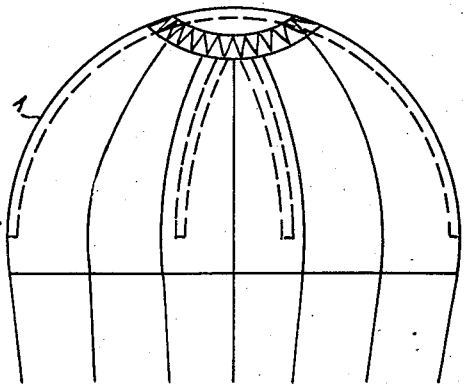
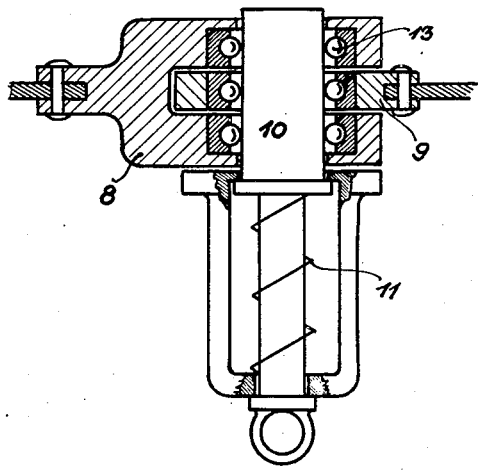
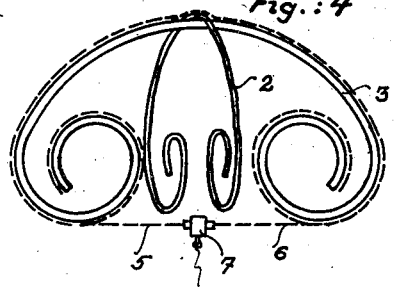
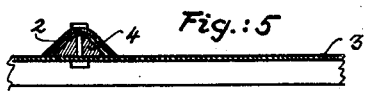
Inventor
Josef Eschner
by L. Sokal
Attorney Feb. 6, 1934. J. ESCHNER 1,946,066
PARACHUTE
Filed Aug. 26, 1931 2 Sheets-Sheet 2
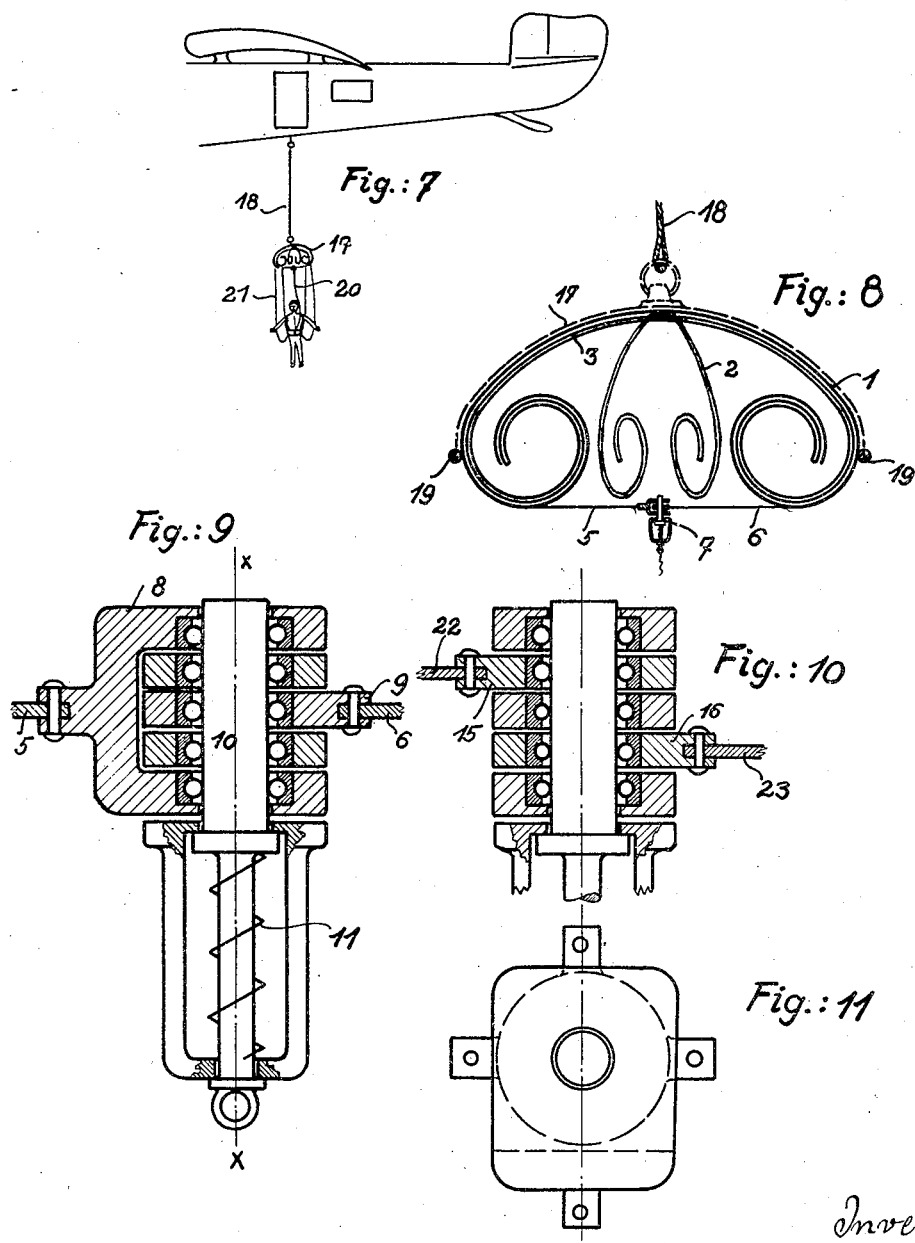

Patented Feb. 6, 1934

1,946,066

UNITED STATES PATENT OFFICE 1,946,066

PARACHUTE

Josef Eschner, Vienna, Austria

Application August 26, 1931, Serial No. 559,452, and in Austria September 25, 1930

4 Claims. (Cl. 244—21)

The present invention relates to parachutes and has for its object to provide improved means for facilitating or causing the opening of the parachute. This object is, according to the invention, obtained by providing a resilient framing which is fixed to the canopy of the parachute and consists of two or more crossed band springs. In the preferred construction of the invention the band springs are made of arched section for the purpose of increasing their tendency when rolled up and released to return into their open or unrolled condition, simultaneously opening the parachute.

The accompanying drawings show by way of example one construction embodying the features of the invention.

Fig. 1 is an inverted plan showing the resilient framing and a portion of the canopy.

Fig. 2 shows in elevation the canopy in the open position of the parachute.

Fig. 3 shows in sectional elevation a locking device for holding the elastic framing in its rolled up condition.

Fig. 4 shows the elastic framing in its rolled up condition, a portion of the framing being omitted.

Fig. 5 is a section on line V—V of Fig. 1,

Fig. 6 is a cross section of a band spring,

Fig. 7 shows diagrammatically the parachute and the means for attaching it to an aircraft, Fig. 8 shows the parachute with the elastic framing and the canopy in the rolled up condition, Fig. 9 shows in sectional elevation a modified form of locking device for holding the elastic framing in its rolled up condition, Fig. 10 is a section of the modified form of locking device taken on line X—X of Fig. 9, and Fig. 11 is a plan of the modified form of locking device.

The parachute comprises a canopy 1 which is fixed to a resilient framing comprising two crossed springs 2 and 3. These springs are of arched cross section, as shown in Fig. 6. Owing to this construction, the springs have, with a comparatively small weight, a considerable moment of resistance and have therefore when rolled up a very considerable tendency to resume their normal position, whereby an absolutely reliable opening action of the parachute is ensured. It is important that the band springs should retain their arched section at the point of crossing. For this purpose the cavity at the point of crossing of the two bands is filled by a fitted member 4 inserted into the cavity and fixed to the two springs by a bolt. In the rolled up condition of the parachute (Figs. 4 and 8), the parachute is held by cords or like members 5, 6 attached to the canopy and connected to an easily releasable lock 7. The lock comprises, as may be seen from Fig. 3, a fork member 8 connected to one cord and an eye member 9 fixed to another cord and engaged by the fork member. The fork member 8 and the eye member 9 are coupled by a coupling bolt 10, which is held in its locking position by a spring 11. In order to reduce friction upon withdrawal of the bolt 10, both the fork and the eye members are provided with ball bearings 17 for the reception of the locking bolt 10.

When using the parachute, the lock is released, whereupon the rolled up springs immediately assume their normal positions and open the parachute.

For holding the parachute in the closed position two further cords or like members 22, 23 (Figs. 9 and 10) may also be provided, said cords or like members being likewise attached to the canopy and being arranged at right angles to the cords 5, 6. In this case the releasable lock to which the cords 5, 6, 22, 23 are connected is constructed in the modified form illustrated in Figs. 9 and 10. The lock comprises as before a fork member 8 connected to the cord 5 and an eye member 9 connected to the cord 6; but in addition to this is provided with two further eye members 15 and 16 which are connected to the cords 22 and 23 respectively. The locking bolt 10 is connected to a release cord or like member 20. It will be clear that upon withdrawal of the locking bolt 10 through the agency of the release cord 20 all four cords 5, 6, 22 and 23 will be released from the lock, so that the parachute is immediately opened by the springs.

The springs and canopy when in their rolled up condition are located within a sheath member 17 (Fig. 8) which is connected at its tip to a cord or like member 18 attached to the aircraft. The sheath member 17 is provided at its rim with a rubber cord 19 so that it bears tightly up against the canopy 1 and thus offers a certain amount of resistance to the opening out of the parachute.

The parachute is attached to the body of the user by means of cords or like members 21, the release cord being likewise attached to the body of the user. It will be obvious that the release cord 20 must be shorter than the cords 21 (see Fig. 7).

When the user of the parachute jumps from the aircraft, the cord 18 is tensioned whereupon the release cord 20 at once opens the lock by withdrawing the locking bolt 10 and the canopy is drawn out of the sheath member 17 and opened by the action of the springs.

I claim:

1. In a parachute the combination of: a canopy; a framing fixed to said canopy and composed of crossed band springs; and locking means for holding the framing in its rolled up condition, said locking means comprising cords fixed to the opposite ends of the springs and a releasable lock detachably holding the ends of the cords.

2. A parachute comprising in combination: a canopy; a framing fixed to said canopy, said framing comprising crossed band springs, cords for holding the said framing in its rolled up condition; and a releasable lock for holding said framing in its rolled up condition, said releasable lock comprising a fork member, an eye member engaged by said fork member, said fork member and said eye member being connected to the ends of the cords; a spring controlled coupling bolt inserted into said eye member and fork member; and ball bearings in said fork member and eye member for the reception of the coupling bolt, substantially as described.

3. A parachute comprising in combination: a canopy; a framing fixed to said canopy, said framing comprising crossed band springs, four cords for holding said framing in its rolled up condition; and a releasable lock for holding said framing in its rolled up condition, said releasable lock comprising a fork member, eye members engaged by said fork member, said fork member and said eye members being connected to the ends of the cords; a spring controlled coupling bolt inserted into said eye members and fork member; and ball bearings in said fork member and eye members for the reception of the coupling bolt, substantially as described.

4. In a parachute the combination of: a canopy; a framing fixed to said canopy and composed of crossed band springs of arched cross section; and locking means for holding the framing in its rolled-up condition comprising cords and a releasable lock co-operating therewith.

JOSEF ESCHNER.